(12) United States Patent
Yamagishi

(10) Patent No.: US 8,970,871 B2
(45) Date of Patent: Mar. 3, 2015

(54) DOCUMENT PROCESSING SYSTEM THAT EMBEDS UNIQUE INFORMATION IN DOCUMENT

(75) Inventor: Nobuo Yamagishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 723 days.

(21) Appl. No.: 12/869,350

(22) Filed: Aug. 26, 2010

(65) Prior Publication Data
US 2011/0222109 A1 Sep. 15, 2011

(30) Foreign Application Priority Data
Mar. 15, 2010 (JP) ................................ 2010-058533

(51) Int. Cl.
*G06F 3/12* (2006.01)
*G06F 21/64* (2013.01)

(52) U.S. Cl.
CPC ...................................... *G06F 21/64* (2013.01)
USPC ............ 358/1.15; 358/1.9; 358/2.1; 358/1.16

(58) Field of Classification Search
USPC .................. 382/181–231, 309–325
See application file for complete search history.

(56) References Cited

U.S. PATENT DOCUMENTS

| 2003/0074375 | A1* | 4/2003 | Nakamura et al. ............. 707/200 |
| 2006/0242570 | A1* | 10/2006 | Croft et al. .................... 715/517 |
| 2009/0125797 | A1* | 5/2009 | Minagawa et al. ........... 715/221 |
| 2009/0125805 | A1* | 5/2009 | Ananthanarayanan et al. .............................. 715/255 |
| 2009/0129680 | A1* | 5/2009 | Nozaki .......................... 382/195 |
| 2009/0192960 | A1* | 7/2009 | Charles et al. .................. 706/46 |

FOREIGN PATENT DOCUMENTS

| JP | 62042262 A | 2/1987 |
| JP | 10-124490 A | 5/1998 |
| JP | 2000-352928 A | 12/2000 |

OTHER PUBLICATIONS

Office Action dated Mar. 5, 2013 issued by the Japanese Patent Office in counterpart Japanese Patent Application No. 2010-058533.
Office Action issued Jul. 16, 2013, by the Japanese Patent Office in corresponding application No. 2010-058533.

* cited by examiner

*Primary Examiner* — Marcellus Augustin
(74) *Attorney, Agent, or Firm* — Sughrue Mion, PLLC

(57) ABSTRACT

A document processing system includes a unique information acquiring section, a similar document element selecting section and a replacement document data acquiring section. The unique information acquiring section acquires unique information to be recorded. The similar document element selecting section selects one similar document element corresponding to the unique information from each of one or a plurality of groups of similar document elements. The one or the plurality of groups of similar document elements relate to one or a plurality of document elements respectively. The one or the plurality of document elements is contained in document data. The replacement document data acquiring section acquires replacement document data which is generated by replacing the document elements with the respective similar document elements selected by the similar document element selecting section.

11 Claims, 9 Drawing Sheets

| NO. | DOCUMENT ELEMENT | SIMILAR DOCUMENT ELEMENT | SIMILAR DOCUMENT ELEMENT NO. | WEIGHT |
|---|---|---|---|---|
| 1 | DOCUMENT | DOCUMENT | 0 | 1 |
|   |   | PAPER | 1 |   |
| 2 | WORDS | WORDS | 0 | 2 |
|   |   | PHRASES | 1 |   |
|   |   | TOKENS | 2 |   |
| 3 | SYNONYMS | SYNONYMS | 0 | 6 |
|   |   | SAME-MEANING WORDS | 1 |   |
|   |   | EQUIVALENTS | 2 |   |
| 4 | WORDS | WORDS | 0 | 18 |
|   |   | PHRASES | 1 |   |
|   |   | TOKENS | 2 |   |
| 5 | PRINTS | PRINTS | 0 | 54 |
|   |   | PRODUCE A PRINT OF | 1 |   |
| 6 | SYNONYMS | SYNONYMS | 0 | 108 |
|   |   | SAME-MEANING WORDS | 1 |   |
|   |   | EQUIVALENTS | 2 |   |
| 7 | UNIQUE | UNIQUE | 0 | 324 |
|   |   | SPECIFIC | 1 |   |
| 8 | SYNONYMS | SYNONYMS | 0 | 648 |
|   |   | SAME-MEANING WORDS | 1 |   |
|   |   | EQUIVALENTS | 2 |   |

FIG. 4

| NO. | DOCUMENT ELEMENT | SIMILAR DOCUMENT ELEMENT | SIMILAR DOCUMENT ELEMENT NO. | WEIGHT |
|---|---|---|---|---|
| 1 | DOCUMENT | DOCUMENT | 0 | 1 |
| | | PAPER | 1 | |
| 2 | WORDS | WORDS | 0 | 2 |
| | | PHRASES | 1 | |
| | | TOKENS | 2 | |
| 3 | SYNONYMS | SYNONYMS | 0 | 6 |
| | | SAME-MEANING WORDS | 1 | |
| | | EQUIVALENTS | 2 | |
| 4 | WORDS | WORDS | 0 | 18 |
| | | PHRASES | 1 | |
| | | TOKENS | 2 | |
| 5 | PRINTS | PRINTS | 0 | 54 |
| | | PRODUCE A PRINT OF | 1 | |
| 6 | SYNONYMS | SYNONYMS | 0 | 108 |
| | | SAME-MEANING WORDS | 1 | |
| | | EQUIVALENTS | 2 | |
| 7 | UNIQUE | UNIQUE | 0 | 324 |
| | | SPECIFIC | 1 | |
| 8 | SYNONYMS | SYNONYMS | 0 | 648 |
| | | SAME-MEANING WORDS | 1 | |
| | | EQUIVALENTS | 2 | |

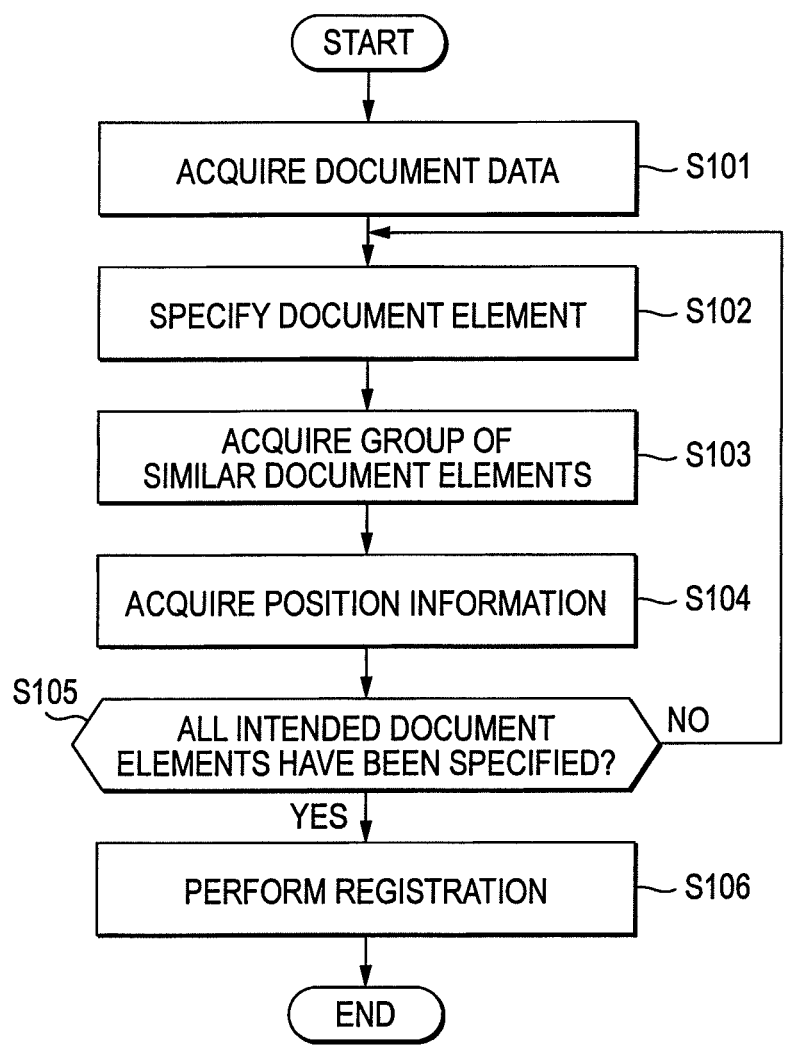

DOCUMENT PROCESSING SYSTEM THAT EMBEDS UNIQUE INFORMATION IN DOCUMENT

CROSS-REFERENCE TO RELATED APPLICATION

This application is based on and claims priority under 35 USC119 from Japanese Patent Application No. 2010-058533 filed on Mar. 15, 2010.

BACKGROUND

1. Technical Field

The present invention relates to a document processing system and a computer-readable medium.

2. Related Art

Techniques for preventing forgery and illegal use of data of a document etc. are known. For example, a technique is known which prints, in the background of a printed document, a latent image that appears when the printed document is copied, thereby allowing a person who looks at the printed document to easily recognize that it is a copy.

Among techniques that make it possible to easily identify a print source are a technique of explicitly printing the name, the employee number, or the like, of a person who has given a print instruction at, for example, an end of a sheet, a technique of printing micro-characters or a combination of fine dots in printing document data, and a printing technique of burying a digital watermark in an image.

SUMMARY

According to an aspect of the invention, a document processing system includes a unique information acquiring section, a similar document element selecting section and a replacement document data acquiring section. The unique information acquiring section acquires unique information to be recorded. The similar document element selecting section selects one similar document element corresponding to the unique information from each of one or a plurality of groups of similar document elements. The one or the plurality of groups of similar document elements relate to one or a plurality of document elements respectively. The one or the plurality of document elements is contained in document data. The replacement document data acquiring section acquires replacement document data which is generated by replacing the document elements with the respective similar document elements selected by the similar document element selecting section.

BRIEF DESCRIPTION OF THE DRAWINGS

Exemplary embodiments of the invention will be described in detail based on the following figures, wherein:

FIG. 4 illustrates a table used in the embodiment of the invention;

FIG. 5 is a flowchart of a source document generation process which is executed in the embodiment of the invention;

DETAILED DESCRIPTION

Figure 1:
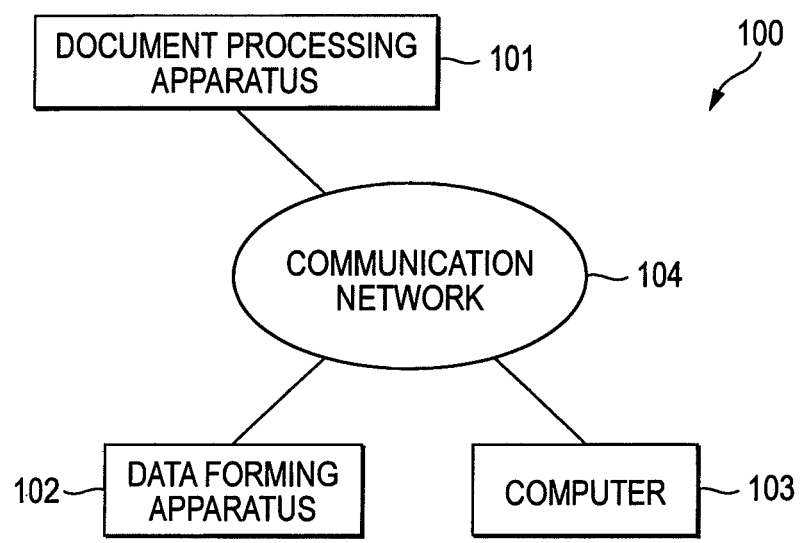
FIG. 1 outlines a document processing system according to an embodiment of the present invention.

An embodiment of the present invention will be hereinafter described with reference to the drawings. The same or equivalent elements are given the same reference symbol in the drawings, and redundant descriptions will be avoided.

FIG. 1 outlines a document processing system according to the embodiment of the invention. As shown in FIG. 1, the document processing system 100 is provided with a document processing apparatus 101, a data forming apparatus 102, and a computer 103 which are connected to each other via a communication network 104.

Figure 2:
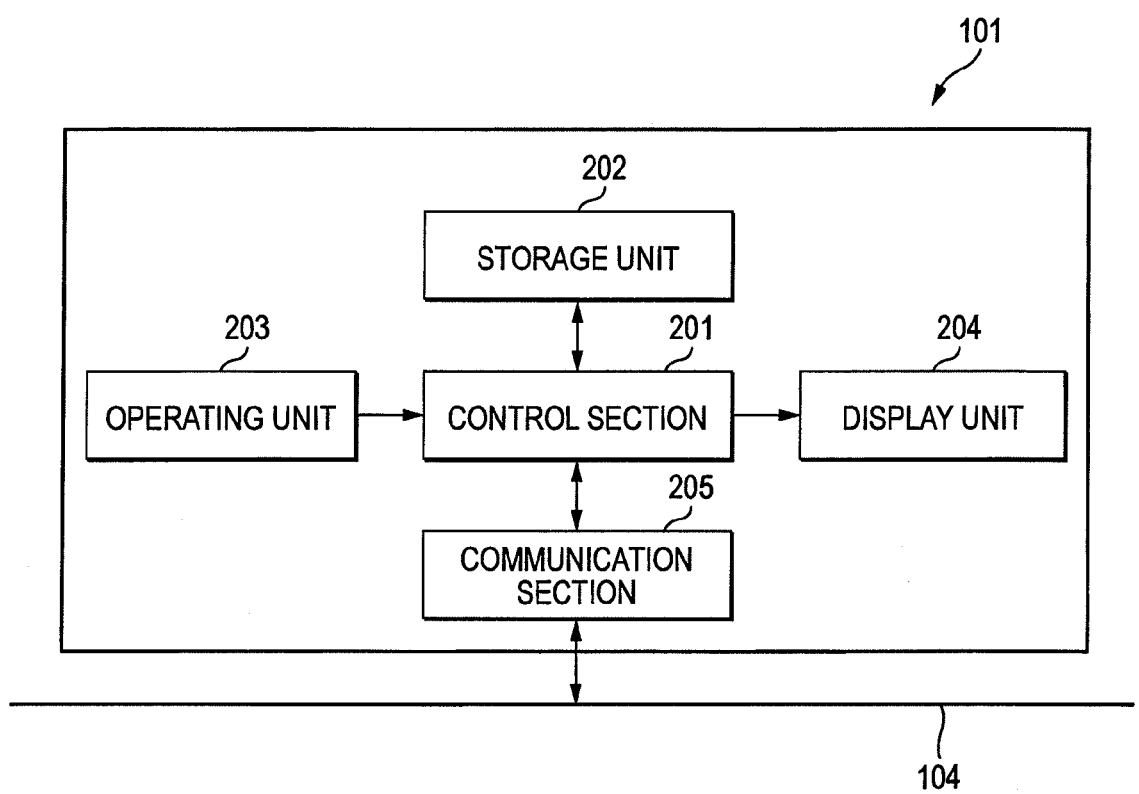
FIG. 2 is a block diagram outlining a document processing apparatus of the document processing system of FIG. 1.

For example, the document processing apparatus 101 is a computer system such as a personal computer. More specifically, as shown in FIG. 2, the document processing apparatus 101 is composed of a control section 201 and a storage unit 202, an operating unit 203, a display unit 204, and a communication section 205 which are connected to the control section 201.

The control section 201, which is a CPU, for example, operates according to programs that are stored in the storage unit 202. The details of processes that are executed by the control section 201 in the embodiment will be described later. The storage unit 202, which consists of information storage media such as a hard disk drive, a ROM, and a RAM, holds programs to be run by the control section 201. The storage unit 202 also serves as a work memory of the control section 201.

The operating unit 203, which is interfaces such as a keyboard and a mouse, outputs the content of a manipulation (instruction) of the user.

The display unit 204, which is a display device such as a liquid crystal display or a CRT display, displays information according to an instruction from the control section 201.

The communication section 205, which is a network interface, for example, sends or receives information over the communication network 104 according to an instruction from the control section 201.

The configuration of the computer 103 shown in FIG. 1 is similar to the configuration of the document processing apparatus 101 which is shown in FIG. 2.

The data forming apparatus 102, which is a printer, a facsimile machine, a copier, a multifunction machine having the functions of those apparatus, or the like, prints document data on media such as sheets according to control information that is transmitted from the document processing apparatus 101 over the communication network 104 or forms document data and sends the document data to a prescribed delivery destination such as the computer 103 over the communication network 104.

Although only the document processing apparatus 101, the data forming apparatus 102, and the computer 103 are connected to the communication network 104 in FIG. 1, one or plural computers and other information apparatus can further be connected to the communication network 104.

Figure 3:
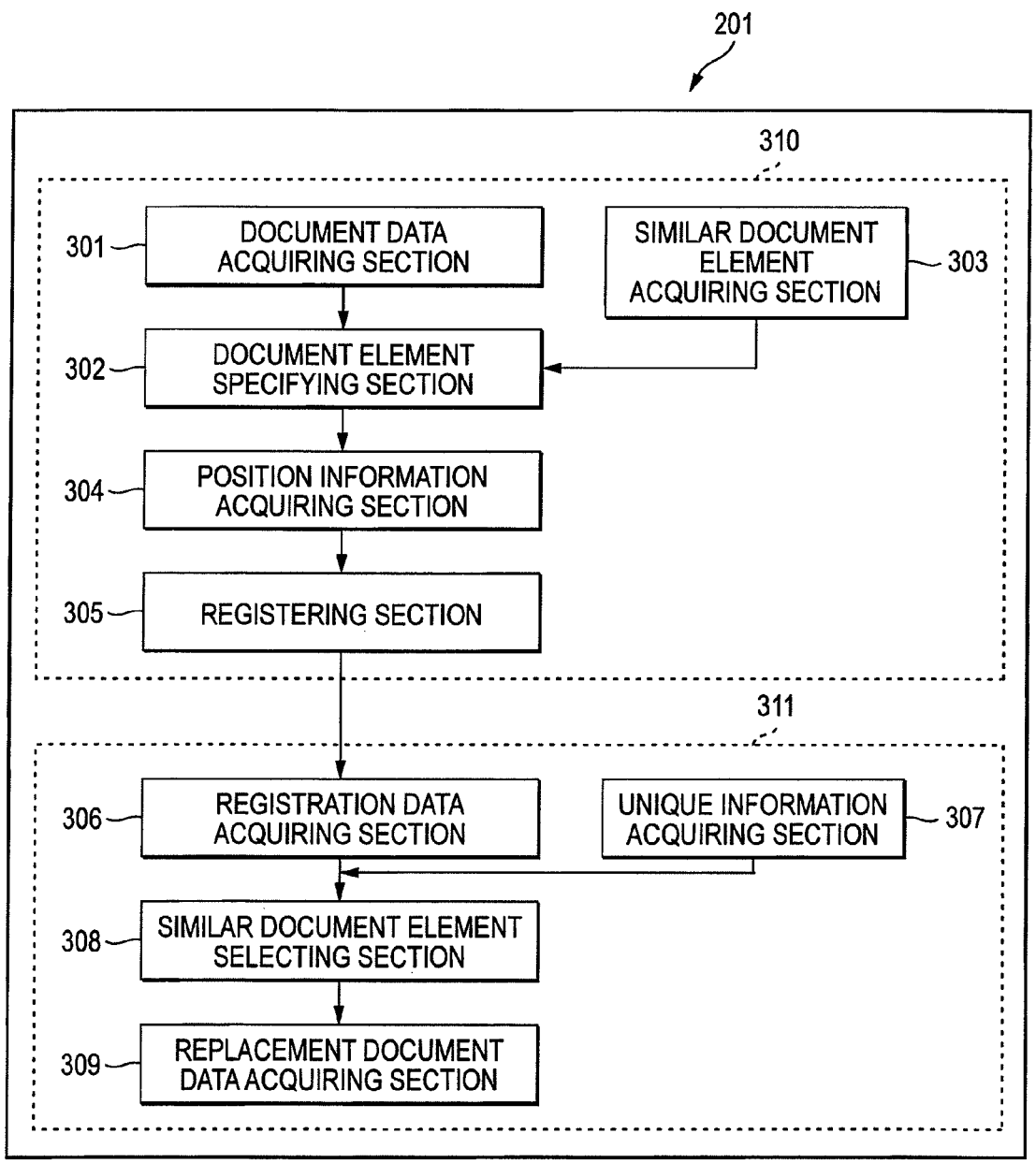
FIG. 3 is a functional block diagram of the document processing apparatus.

FIG. 3 is a functional block diagram of the document processing apparatus 101. The functions of the document processing apparatus 101 that are shown in FIG. 3 are mainly performed by the control section 201. For example, these functions are performed by executing programs that are stored in the storage unit 202. For example, these programs may be provided either by downloading them over the communication network 104 or via any of various computer-readable information storage media such as a CD-ROM and a DVD-ROM.

A document data acquiring section 301 acquires document data that is generated according to manipulations (instructions) made by the user on the operating unit 203. More specifically, for example, the document data acquiring section 301 acquires document data that the user has input through the operating unit 203 using a wordprocessor program that is stored in an information storage medium such as the storage unit 202 while viewing the display unit 204.

Document data to be acquired by the document data acquiring section 301 may be document data that is stored outside the document processing apparatus 101 (e.g., in the computer 103). In this case, it goes without saying that the document data acquiring section 301 acquires the document data over the communication network 104, for example. Document data may include, in addition to text data, arbitrary data such as data of a figure, a photograph, or a table.

A document element specifying section 302 specifies a document element(s) of document data according to a manipulation (instruction) made by the user on the operating unit 203. More specifically, for example, this is done in such a manner that the user specifies one or plural document elements contained in document data using the operating unit 203 while referring to the document data being displayed on the display unit 204. The term "document element" means a word or a symbol such as "'", ".", or "," contained in document data.

A similar document element acquiring section 303 acquires a group of similar document elements that are similar to each specified document element. For example, this is done in such a manner that the user selects, using the operating unit 203, one or more similar document elements that can replace each specified document element from similar document elements that are retrieved from a dictionary by the user.

Alternatively, for example, when a document element is specified, similar document elements that are similar to the specified document element may be displayed by searching a similar document element dictionary that is stored in the storage unit 202 or the computer 103 in advance. A group of similar document elements is acquired in such a manner that the user selects all or part of the displayed similar document elements.

A group of similar document elements consists of one or plural document elements that are similar to a certain document element. The term "similar document element" means a document element that is similar in meaning to a certain document element and does not render the sentence including it unnatural even if the certain document element is replaced by the similar document element. In the embodiment, whether replacement is possible or not is judged by the user. This is to prevent an event that even a similar document element renders the document unnatural when it is substituted.

A position information acquiring section 304 acquires position information of a document element in document data when it is specified. For example, the position information acquiring section 304 acquires, as position information, information indicating where a specified document element stands in the succession of words or characters in the document data. The acquired position information is stored in the storage unit 202 so as to be correlated with the corresponding document element.

A registering section 305 registers groups of similar document elements of respective specified document elements in the form of, for example, a table as shown in FIG. 4 together with similar document element numbers of the respective document elements and weights corresponding to the respective document elements (described later). The table of FIG. 4 is just an example, and groups of similar document elements of respective specified document elements may be registered in any form as long as they are correlated with the respective document elements, the similar document element numbers, and the weights.

As shown in FIG. 4, in the table, each row which corresponds to a document element has a number, the document element, similar document elements, similar document element numbers, and a weight which are arranged rightward in this order.

For example, the entries in the column "number" indicate order of specification of the document elements specified by the document element specifying section 302. The entries in the column "document element" are the document elements that have been specified by the document element specifying section 302. Therefore, FIG. 4 shows a state that the document elements "document" to "synonym" have been specified in this order and the numbers "1" to "8" are assigned to the respective document elements in the same order.

The entries in the column "similar document element" show groups of similar document elements, acquired by the similar document element acquiring section 303, of the respective document elements. FIG. 4 shows a state that "document" and "paper" are registered as similar document elements of the document element "document" and "words," "phrases," and "tokens" are registered as similar document elements of the document element "words." Similar document elements of each of the other document elements are registered likewise as shown in FIG. 4.

The entries in the column "similar document element number" are numbers in which numbers are assigned to the similar document elements of each group in ascending order starting from "0." FIG. 4 shows a state that numbers "0" and "1" are registered for the respective similar document elements "document" and "paper" of the document element "document" and that "0," "1," and "2" are registered for the respective similar document elements "words," "phrases," and "tokens" of the document element "words." Similar document element numbers for each of the other document elements are registered likewise as shown in FIG. 4. For example, the arrangement order of similar document elements may be the same as order in which they have been selected by the user.

As for the weights, "1" is assigned as a weight to the first document element. And a number obtained by multiplying the weight for the (N−1)th document element by the number of similar document elements of the (N−1)th document element is assigned as a weight to the Nth document element. N is an integer that is larger than or equal to 2.

That is, a number obtained by multiplying the weight for the first document element by the number of similar document elements of the first document element is assigned to the second document element. In the example of FIG. 4, since the weight for the first document element is "1" and the number of similar document elements of the first document element is "2," a weight "2" (=1×2) is assigned to the second document element.

A number obtained by multiplying the weight for the second document element by the number of similar document elements of the second document element is assigned to the third document element. In the example of FIG. 4, since the weight for the second document element is "2" and the number of similar document elements of the second document element is "3," a weight "6" (=2×3) is assigned to the third document element. Weights calculated likewise are assigned to the fourth and following document elements.

The registering section 305 stores the table that has been registered in the above-described manner in, for example, the storage unit 202 or an information storage medium of an apparatus located outside the document processing apparatus 101, such as the computer 103. The table may be stored together with the document data in the form of a document file.

A registration data acquiring section 306 acquires the table which is stored in the storage unit 202 or some other information storage medium. Where the table is stored in the form of a document file, it may be acquired by opening the document file.

A unique information acquiring section 307 acquires unique information that was input by a manipulation (instruction) made by the user on the operating unit 203. The unique information may be any individual piece of information such as an employee number or a driver's license number.

A similar document element selecting section 308 selects a similar document element from the group of similar document elements of each document element according to the unique information. To simplify the description, the following description will be made with an assumption that the unique information is the same as a unique number that is acquired in the following manner. However, the unique information need not always be the same as such a unique number as long as they are in one-to-one correspondence. Although in an actual process each similar document element is selected according to a unique number, to simplify the description the following description will be made in opposite order, that is, calculation of a unique number will be described first.

A unique number is calculated as the sum of numbers each obtained by multiplying the weight for a document element by the similar document element number of the selected document element of the document element in the table. More specifically, in the example of FIG. 4, if similar document elements "paper," "words," "same-meaning words," "phrases," "produces a print of," "synonyms," "unique," and "equivalents" are selected for respective specified document elements in document data, a unique number is calculated according to the following Equation (1) using the table.

$$(1 \times 1) + (2 \times 0) + (6 \times 1) + (18 \times 1) + (54 \times 1) + (108 \times 0) + (324 \times 0) + (648 \times 2) = 1375 \quad (1)$$

The eight terms as arranged in Equation (1) correspond to the respective numbers arranged downward in the column "number" of the table.

In the above-described manner, a unique number is calculated when similar document elements are selected for the respective document elements.

Where a unique number that is calculated in the above-described manner is the same as unique information (mentioned above), each similar document element can be selected by calculating Equation (1) in the opposite direction according to the unique information. In the above configuration, one combination of similar document elements corresponds to one unique number. In other words, one similar document element is selected from the group of similar document elements corresponding to each document element according to unique information.

Although the above description has been made with the assumption that pieces of unique information are the same as unique numbers, pieces of unique information may be different from unique numbers as long as the two groups can be correlated with each other so that one unique number can be derived from one piece of unique information.

For example, where pieces of unique information are employee numbers, it may be enabled to derive one unique number from one employee number by causing all or part of employee numbers arranged in ascending order to correspond to unique numbers arranged in ascending order. In this case, when an employee number is acquired as unique information, a unique number is derived from the unique information and a combination of similar document elements is determined on the basis of the unique number in the above-described manner. The document processing apparatus 101 is configured so that information of a relationship between pieces of unique information and unique numbers is stored in information storage medium such as the storage unit 202 and a unique number can be derived from unique information.

A replacement document data acquiring section 309 generates a replacement document data in which the document elements in the document data are replaced by the respective similar document elements on the basis of the selection results of the similar document element selecting section 308, and stores the generated replacement document data in the storage unit 202.

Although the above-described configuration is such that a source document generating section 310 and a delivery document generating section 311 (see FIG. 3) are part of the document processing apparatus 101, they may be provided in a separate document processing apparatus.

Next, processes that are executed by the document processing apparatus 101 will be described with reference to flowcharts. First, a source document generation process which is executed by the document processing apparatus 101 will be described. The source document generation process is a preparatory process which is executed before burying unique information in document data.

The following description will be directed to example document data "A document generation system extracts, from the sentences of a document to be printed, several words, retrieves synonyms from a dictionary, replaces them with other words, and prints a result. This is done in such a manner that different sets of similar document elements are selected for respective persons who produce outputs, whereby unique outputs are obtained for the respective persons. The output-producing persons and the sets of similar document elements are correlated with each other, so that an output-producing person can be determined from an output product."

FIG. 5 is a flowchart of the source document generation process. First, at step S101, the document data acquiring section 301 acquires document data. More specifically, for example, as described above, the document data acquiring section 301 acquires document data that the user has input through the operating unit 203 (e.g., a keyboard and a mouse) using a wordprocessor program that is stored in an information storage medium such as the storage unit 202 while viewing the display unit 204.

At step S102, the document element specifying section 302 specifies a document element in the acquired document data. At step S103, the similar document element acquiring section 303 acquires a group of similar document elements corresponding to the specified document element. At step S104, the position information acquiring section 304 acquires position information of the specified document element. Steps S103 and S104 may be interchanged. The details of steps S103 and 104 have already been described above.

At step S105, it is judged whether or not all intended document elements have been specified. If not all intended document elements have been specified (S105: no), the process returns to step S102.

On the other hand, if all intended document elements have already been specified (S105: yes), at step S106 the groups of similar document elements and the pieces of position information are registered. More specifically, for example, they are registered in the form of a table like the table of FIG. 4. As described above, similar document element numbers and weights are also registered at step S106.

Then, the source document generation process is finished. The above-described source document generation process is just an example. A different source document generation process may be employed as long as it is substantially the same as the above-described one. For example, as for the registration timing, a document element may be registered when it is specified and a group of similar document elements may be registered when it is acquired.

Next, a delivery document generation process will be described. The delivery document generation process is a process of generating a delivery document in which digital information (in the embodiment, for example, unique information) which depends on a delivery destination is buried.

Figure 6:
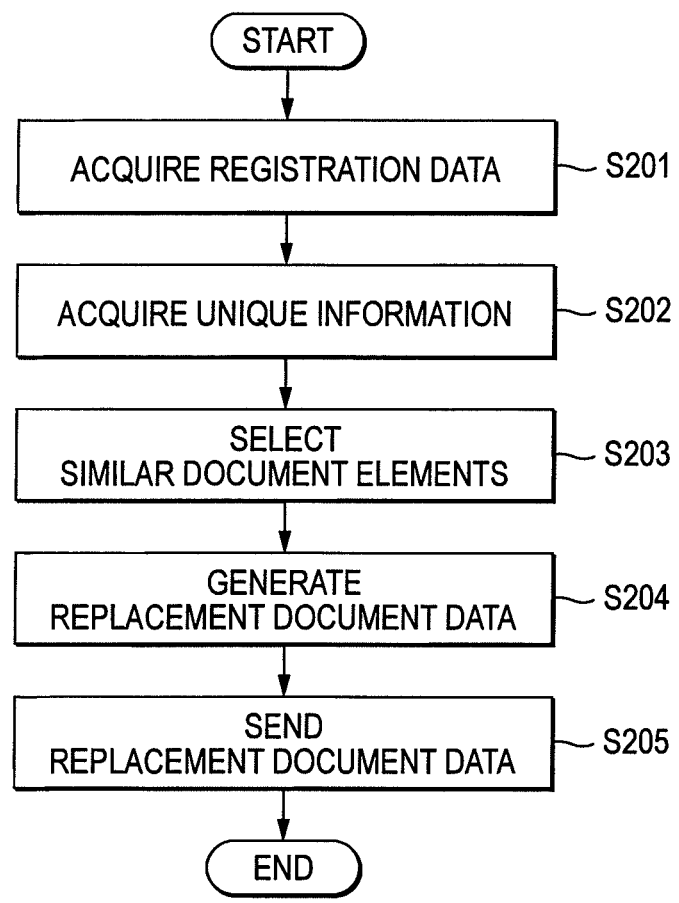
FIG. 6 is a flowchart of a delivery document generation process which is executed in the embodiment of the invention.

FIG. 6 is a flowchart of the delivery document generation process. Upon a start of the delivery document generation process, at step S201, the registration data acquiring section 306 acquires the registration data that were generated in the above-described source document generation process, that is, the table. This is done by executing a delivery command.

At step S202, the unique information acquiring section 307 acquires unique information together with delivery destination information. More specifically, for example, this is done in such a manner that the user inputs unique information and delivery destination information such as a name or a person's name, an address, and a telephone number of a delivery destination using the operating unit 203 through an information input picture that is displayed on the display unit 204 upon execution of the delivery command. The delivery destination information is stored in the storage unit 202 so as to be correlated with the unique information.

At step S203, the similar document element selecting section 308 selects, according to the unique information, a similar document element for each document element from the corresponding group of similar document elements contained in the acquired table. This step will be described more specifically using the table of FIG. 4 for a case that the unique information is the same as a unique number.

When "1375," for example, is input as a unique number, similar document element numbers corresponding to the respective document elements are calculated by calculating Equation (1) in the opposite direction. Similar document elements are determined from the respective similar document element numbers. Then, similar document elements "paper," "words," "same-meaning words," "phrases," "produces a print of," "synonyms," "unique," and "equivalent" are selected for the respective document elements from the first one downward in the table of FIG. 4.

At step S204, the replacement document data acquiring section 309 replaces the document elements in the document data with the respective selected similar document elements. For example, in the case of the above-mentioned example document data, replacement document data "A document generation system extracts, from the sentences of a [paper] to be printed, several [words], retrieves [same-meaning words] from a dictionary, replaces them with other [phrases], and [produces a print of] a result. This is done in such a manner that different sets of [synonyms] are selected for respective persons who produce outputs, whereby [unique] outputs are obtained for the respective persons. The output-producing persons and the sets of [equivalents] are correlated with each other, so that an output-producing person can be determined from an output product." is generated.

In the replacement document data, the portions each enclosed by brackets "[" and "]" are the selected similar document elements. It goes without saying that the brackets "[" and "]" are not included in the actual replacement document data.

At step S205, the replacement document data thus generated is sent to the data forming apparatus 102, for example, via the communication section 205 over the communication network 104. The replacement document data may be either printed as a delivery document by the data forming apparatus 102 and delivered to the prescribed delivery destination or electronically delivered as delivery document data to the desired delivery destination such as the computer 103 over the communication network 104.

Then, the delivery document generation process is finished. The above-described delivery document generation process is just an example. A different delivery document generation process may be employed as long as it is substantially the same as the above-described one.

Next, a configuration for extracting unique information that was buried in the above-described manner in the event of information leakage will be described.

Figure 7:
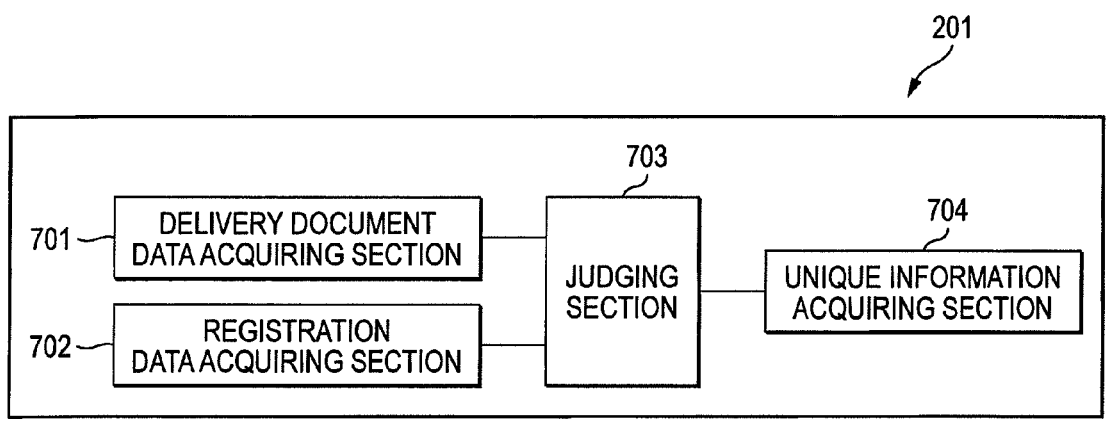
FIG. 7 is a functional block diagram showing the configuration of a collating apparatus according to the embodiment of the invention.

FIG. 7 is a functional block diagram showing the configuration of a collating apparatus according to the embodiment. The functions of the collating apparatus 700 shown in FIG. 7 are mainly performed by the control section 201. Although in the embodiment the collating apparatus 700 is provided in the control section 201 as part of the document processing apparatus 101, it may be provided separately from the document processing apparatus 101 (e.g., in the computer 103).

As shown in FIG. 7, the collating apparatus 700 is provided with a delivery document data acquiring section 701, a registration data acquiring section 702, a judging section 703, and a unique information acquiring section 704.

The delivery document data acquiring section 701 acquires document data of a delivered document that is read out by a reading device such as a scanner (not shown). This document data corresponds to delivery document data (described above). The registration data acquiring section 702 acquires the table from an information storage medium such as the storage unit 202. The term "similar document element acquiring means" used in the claims corresponds to the registration data acquiring section 702, for example.

The judging section 703 judges which similar document element of the corresponding group of similar document elements in the table the similar document element that is substituted for each document element corresponds to by comparing the similar document elements in the document data acquired by the delivery document data acquiring section 701 with the corresponding groups of similar document elements in the table. The positions of the similar document elements in the document data are determined by, for example, using the above-described pieces of position information of the document elements.

The unique information acquiring section 704 calculates a unique number on the basis of the judgment results of the judging section 703. Then, the unique information acquiring section 704 acquires unique information from the unique number according to the corresponding relationship between the unique numbers and the pieces of unique information which, as described above, is stored in an information storage medium such as the storage unit 202. It goes without saying that the unique number itself is employed as unique information in the case where unique numbers are the same as pieces of unique information.

Figure 8:
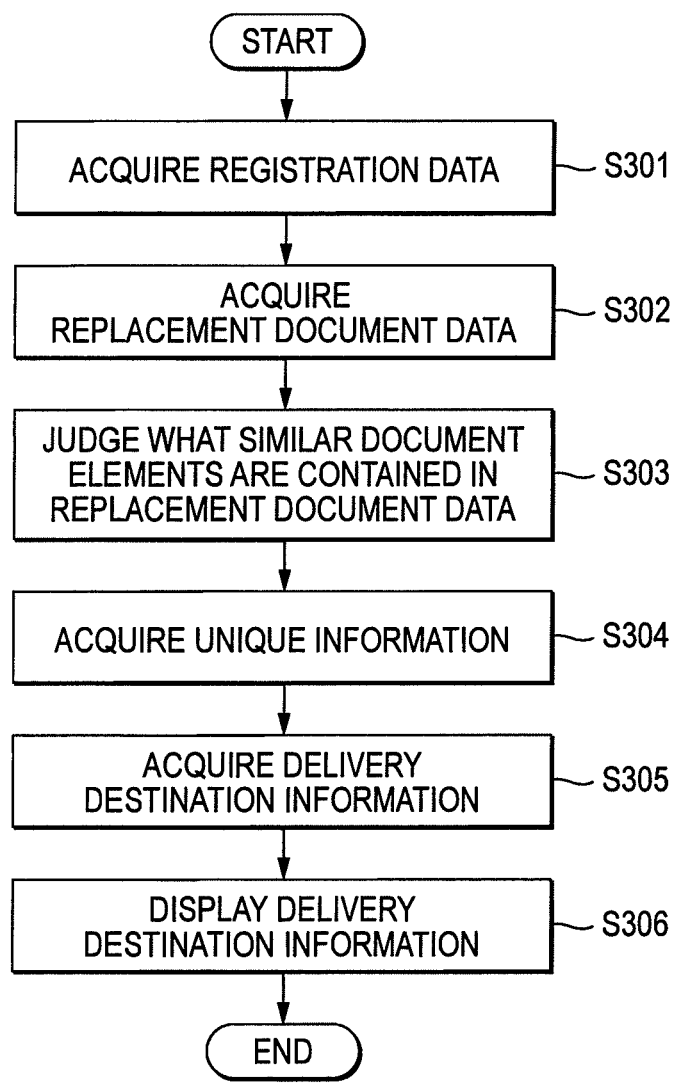
FIG. 8 is a flowchart of a collation process which is executed by the collating apparatus of FIG. 7.

FIG. 8 is a flowchart of a collation process which is executed by the collating apparatus 700. As shown in FIG. 8, upon a start of the collation process, the registration data acquiring section 702 acquires the table as the registration data at step S301 and the delivery document data acquiring section 701 acquires replacement document data at step S302. For example, replacement document data is acquired in the above-described manner.

At step S303, the judging section 703 judges what similar document elements are contained in the replacement document data by comparing the replacement document data with the registration data. At step S304, the unique information acquiring section 704 acquires unique information according to judgment results. More specifically, for example, if judging that the similar document element "paper" exists in the replacement document data at the position of the document element "document" which is registered in the table, the judging section 703 acquires the similar document element number "1" of this similar document element. In this manner, the judging section 703 acquires similar document element numbers corresponding to the respective document elements in the replacement document data using the table. The unique information acquiring section 704 acquires a unique number by adding together the products of the acquired similar document element numbers and the corresponding weights, and acquires unique information from the unique number in the above-described manner.

At step S305, delivery destination information is acquired from the acquired unique information. At step S306, the delivery destination information is displayed on the display unit 204. Then, the collation process is finished. Since as described above pieces of unique information and pieces of delivery destination information are stored in an information storage medium such as the storage unit 202 so as to be correlated with each other, necessary delivery destination information can be obtained by referring to the information storage medium.

The above-described collation process is just an example. A different collation process may be employed as long as it is substantially the same as the above-described one.

Instead of being executed by the collating apparatus 700 in the above-described manner, the collation process may be such that, for example, the user acquires unique information by comparing delivered document data with the table and acquires delivery destination information by searching another database on the basis of the acquired unique information.

With the above-described configuration, the embodiment makes it possible to deliver a delivery document or delivery document data generated by utilizing the above-described illegal use preventing technique while lowering the probability that the illegal use preventing technique is applied to the delivery document or delivery document data.

Since the illegal use preventing technique is applied to sentences themselves, it is highly probable that pieces of illegal use preventing information remain even if a delivery document or delivery document data is converted into a text by manual input. Furthermore, the pieces of illegal use preventing information are not degraded even if the delivery document or delivery document data is copied repeatedly.

Where the same document is distributed simultaneously to plural destinations as in the case of using a function of distributing a mail magazine or an e-mail to plural persons, the embodiment makes it possible to determine a primary destination on the basis of the contents of a citation even if (part of) a distributed document is cited at another place because unique documents are generated for respective destinations and distributed to them.

For example, although in the embodiment the user inputs a unique number for what is to be output, the document processing apparatus 101 may generate a unique number. More specifically, for example, a modification is possible in which a unique number used in delivering a document or document data is stored and a next unique number is generated at the time of the next delivery. For another example, a unique hash value may be calculated from delivery destination information that is input by the user and employed as a unique number.

Figure 9:
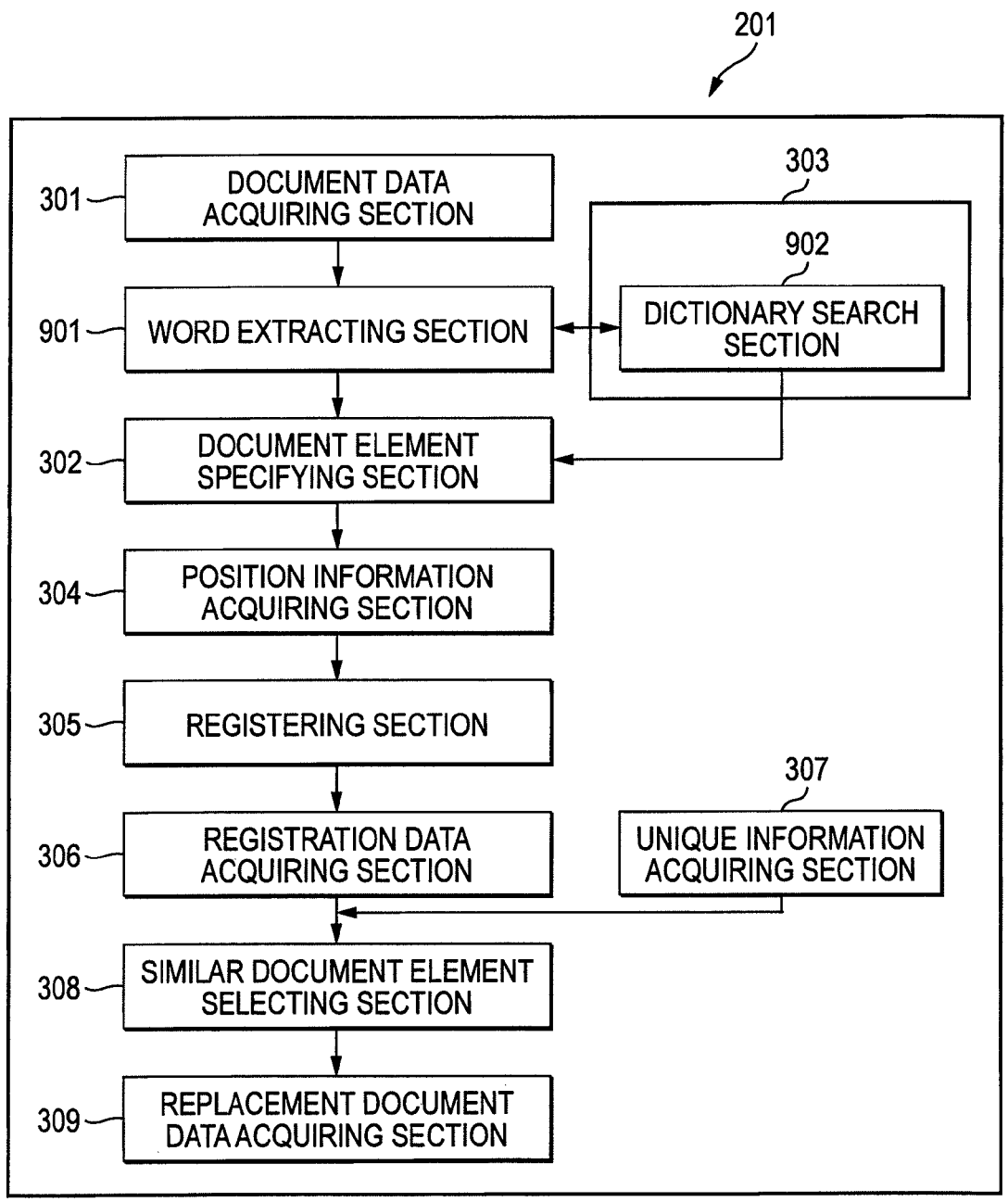
FIG. 9 is a functional block diagram of a document processing apparatus according to a modification of the embodiment of the invention.

As shown in FIG. 9, a document processing apparatus 101*a* according to this modification is different from the document processing apparatus 101 according to the embodiment in that the document processing apparatus 101*a* also has a word extracting section 901 and the similar document element acquiring section 303 also has a dictionary search section 902. The modification is the same as the embodiment in the other respects, which will not be described in detail.

As shown in FIG. 9, in the modification, the document processing apparatus 101*a* has the word extracting section 901, which extracts words from document data.

The similar document element acquiring section 303 has the dictionary search section 902, which judges whether or not a similar document element corresponding to a word or symbol extracted by the word extracting section 901 exists using a similar document element dictionary that is stored in the storage unit 202, for example.

If one or plural similar document elements exist, the document element specifying section 302 specifies the word or symbol as a document element. On the other hand, no similar document element exists, the same processing is performed on the next word or symbol extracted by the word extracting section 901.

As described above, in this modification, words are extracted automatically from document data by the word extracting section 901 and only words and symbols each having a similar document element are specified as document elements by searching the similar document element dictionary. That is, unlike in the above-described embodiment, the user is not required to specify document elements or select and register similar document elements. For example, the similar document element dictionary is a dictionary from which synonyms and similar symbols can be retrieved.

A configuration is possible in which the user extracts only words or symbols. In this case, only the registration of similar document elements is performed automatically. Another configuration is possible in which a list of similar document elements is displayed and the user selects one or plural similar document elements from each group of similar document elements.

Like the above-described embodiment, this modification makes it possible to deliver a delivery document or delivery document data generated by utilizing the above-described illegal use preventing technique while lowering the probability that the illegal use preventing technique is applied to the delivery document or delivery document data.

Since the illegal use preventing technique is applied to sentences themselves, it is highly probable that pieces of illegal use preventing information remain even if a delivery document or delivery document data is converted into a text by manual input. Furthermore, the pieces of illegal use preventing information are not degraded even if the delivery document or delivery document data is copied repeatedly.

Where the same document is distributed simultaneously to plural destinations as in the case of using a function of distributing a mail magazine or an e-mail to plural persons, this modification makes it possible to determine a primary destination on the basis of the contents of a citation even if (part of) a distributed document is cited at another place because unique documents are generated for respective destinations and distributed to them.

The invention is not limited to the above embodiment or modification and other various modifications are possible. For example, each element of the embodiment or modification can be replaced by substantially the same element, an element capable of providing the same workings and advantages, or an element capable of attaining the same object.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing system comprising:
    a unique information acquiring section that acquires unique information to be recorded;
    a similar document element selecting section that selects one similar document element corresponding to the unique information from each of one or a plurality of groups of similar document elements which relate to one or a plurality of document elements respectively, the one or the plurality of document elements contained in document data;
    a replacement document data acquiring section that acquires replacement document data which is generated by replacing the document elements with the respective similar document elements selected by the similar document element selecting section;
    a position information acquiring section that acquires a piece or pieces of position information indicating a position or positions of the one or the plurality of document elements contained in the document data; and
    a registering section that registers the groups of similar documents elements in a storage unit in such a manner that the pieces of position information acquired by the position information acquiring section are correlated with the document elements respectively,
    wherein the one or the plurality of document elements are selected by a user, and each of the one or the plurality of document elements in a word contained in the document data,
    wherein the registering section registers the groups of similar document elements in such a manner that similar document element numbers starting from 0 are correlated, in number order, with the respective similar document elements of each group, and
    where the registering section registers the document elements in number order as a table form with weights correlated with the respective document elements in such a manner that a weight corresponding to a first document element is 1 and a weight corresponding to an Nth document element is obtained by multiplying a weight of an (N−1)th document element by a number of similar document elements of a group of similar document elements which relates to the (N−1)th document element, when N is an integer that is larger than or equal to 2.

2. The document processing system according to claim 1, further comprising:
    a similar document element acquiring section that acquires the one or the plurality of groups of similar document elements which relate to the one or the plurality of document elements respectively, the one or the plurality of document elements contained in the replacement document data;
    a judging section that judges similar document element of each group of similar document elements is included in the replacement document data, the similar document element of each group of similar document elements substituted for each of the document elements; and
    a unique information acquiring section that acquires unique information relating to the replacement document data based on the similar document elements judged by the judging section.

3. The document processing system according to claim 1, wherein
    the storage unit stores information relating to a delivery destination of the replacement document data in such a manner that the information relating to the delivery destination is correlated with the unique information.

4. The document processing system according to claim 1, further comprising:
    a document element specifying section that specifies the one or the plurality of document elements.

5. The document processing system according to claim 1, wherein
    the unique information includes information which corresponds the weights correlated with the respective document elements and the similar document element numbers of the respective selected similar document elements.

6. A document processing system comprising:
    a unique information acquiring section that acquires unique information to be recorded;
    a position information acquiring section that acquires a piece or pieces of position information indicating a position or positions, in document data, of one or a plurality of document elements contained in the document data; and
    a registering section that registers one or a plurality of groups of similar document elements in a storage unit in such a manner that the one or the plurality of groups of similar document elements are correlated with the piece or pieces of position information of the one or the plurality of document elements acquired by the position information acquiring section respectively,
    wherein the one or the plurality of document elements are selected by a user,
    wherein the storage unit stores information relating to a delivery destination of replacement document data in such a manner that information relating to the delivery destination is correlated with the unique information, wherein the registering section registers the groups of similar documents elements in such a manner that similar document element numbers starting from 0 are correlated, in number order, with the respective similar document elements of each group, and wherein the registering section registers the document elements in number order as a table from with weights correlated with the respective document elements in such a manner that a weight corresponding to a first document element is 1 and a weight corresponding to an Nth document element is obtained by multiplying a weight of an (N −1)th document element by a number of similar document elements of a group of similar document elements which relates to the (N−1)th document element, when N is an integer that is larger than or equal to 2.

7. A document processing system comprising:

a similar document element acquiring section that acquires one or a plurality of groups of similar document elements which relate to one or a plurality of document elements respectively and which are similar in meaning to the one or the plurality of document elements respectively, the one or the plurality of document elements contained in replacement document data;

a judging section that judges similar document element of each group of similar document elements is included in a replacement document data, the similar document element of each group of similar document elements substituted for each of the document elements;

a unique information acquiring section that acquires unique information relating to the replacement document data based on the similar document elements judged by the judging section;

a position information acquiring section that acquires a piece or pieces of position information indicating a position or positions of the one or the plurality of document elements contained in the document data; and a registering section that registers the groups of similar document elements in a storage unit in such a manner that the pieces of position information acquired by the position information acquiring section are correlated with the document elements respectively, wherein the one or the plurality of document elements are selected by a user, and each of the one or the plurality of document elements is a word contained in the document data wherein the registering section registers the groups of similar document elements in such a manner that similar document element numbers starting from 0 are correlated, in number order, with the respective similar document elements of each group, and wherein the registering section registers the document elements in number order as a table form with weights correlated with the respective document elements in such a manner that a weight corresponding to a first document element is 1 and a weight corresponding to an Nth document element is obtained by multiplying a weight of an (N −1)th document element by a number of similar document elements of a group of similar document elements which relates to the (N−1)th document element, when N is an integer that is larger than or equal to 2.

8. A non-transitory computer-readable medium storing a program that causes a computer to execute document processing, the document processing comprising:

acquiring unique information to be recorded;

selecting one similar document element corresponding to the unique information from each of one or a plurality of groups of similar document elements which relate to one or a plurality of document elements respectively and which are similar in meaning to the one or the plurality of document elements respectively, the one or the plurality of document elements contained in document data;

acquiring replacement document data which is generated by replacing the document elements with the respective similar document elements selected in the selecting step;

acquiring a piece or pieces of position information indicating a position or positions of the one or the plurality of document elements contained in the document data; and registering the groups of similar document elements in a storage unit in such a manner that the pieces of position information acquired by the position information acquiring section are correlated with the document elements respectively, wherein the one or the plurality of document elements are selected by a user, and each of the one or the plurality of document elements is a word contained in the document data, wherein the registering registers the groups of similar document elements in such a manner that similar document element numbers starting from 0 are correlated, in number order, with the respective similar document elements of each group, and wherein the registering registers the document elements in number order as a table form with weights correlated with the respective document elements in such a manner that a weight corresponding to a first document element is 1 and a weight corresponding to an Nth document element is obtained by multiplying a weight of an (N −1)th document element by a number of similar document elements of a group of similar document elements which relates to the (N−1)th document element, when N is an integer that is larger than or equal to 2.

9. A non-transitory computer-readable medium storing a program that causes a computer to execute document processing, the document processing comprising:

acquiring unique information to be recorded;

acquiring a piece or pieces of position information indicating a position or positions, in document data, of one or a plurality of document elements contained in the document data; and registering one or a plurality of groups of similar document elements in a storage unit in such a manner that the one or the plurality of groups of similar document elements are correlated with the piece or pieces of position information of the one or the plurality of document elements acquired in the acquiring step respectively, wherein the one or the plurality of document elements are selected by a user, and registering one or a plurality of groups of similar document elements in a storage unit in such a manner that the one or the plurality of groups of similar document elements are correlated with the piece or pieces of position information of the one or the plurality of document elements acquired in the acquiring step respectively, wherein the one or the plurality of document elements are selected by a user, and wherein the storage unit stores information relating to a delivery destination of replacement document data in such a manner that the information relating to the delivery destination is correlated with the unique information, wherein the registering registers the groups of similar document elements in such a manner that similar document element numbers starting from 0 are correlated, in number order, with the respective similar document elements of each group, and wherein the registering registers the document elements in number order as a table form with weights correlated with the respective document elements in such a manner that a weight corresponding to a first document element is 1 and a weight corresponding to an Nth document element is obtained by multiplying a weight of an (N−1)th document element by a number of similar document elements of a group of similar document elements which relates to the (N−1)th document element, when N is an integer that is larger than or equal to 2.

10. A non-transitory computer-readable medium storing a program that causes a computer to execute document processing, the document processing comprising:

acquiring one or a plurality of groups of similar document elements which relate to one or a plurality of document elements respectively and which are similar in meaning to the one or the plurality of document elements respectively, the one or the plurality of documents contained in replacement document data;

judging similar document element of each group of similar document elements is included in a replacement document data, the similar document element of each group of similar document elements substituted for each of the document elements;

acquiring unique information relating to the replacement document data based on the similar document elements judged in the judging step;

acquiring a piece or pieces of position information indicating a position or positions of the one or the plurality of document elements contained in the document data; and registering the groups of similar document elements in a storage unit in such a manner that the pieces of position information acquired by the position information acquiring section are correlated with the document elements respectively, wherein the one or the plurality of document elements are selected by a user, and each of the one or the plurality of document elements is a word contained in the document data, wherein the registering registers the groups of similar document elements in such a manner that similar document element numbers starting from 0 are correlated, in number order, with the respective similar document elements of each group, and wherein the registering registers the document elements in number order as a table form with weights correlated with the respective document elements in such a manner that a weight corresponding to a first document element is 1 and a weight corresponding to an Nth document element is obtained by multiplying a weight of an (N−1)th document element by a number of similar document elements of a group of similar document elements which relates to the (N−1)th document element, when N is an integer that is larger than or equal to 2.

11. A document processing system comprising:

a unique information acquiring section that acquires unique information to be recorded;

a similar document element selecting section that selects one similar document element corresponding to the unique information from each of one or a plurality of groups of similar document elements which relate to one or a plurality of document elements respectively, the one or the plurality of document elements contained in document data;

a replacement document data acquiring section that acquires replacement document data which is generated by replacing the document elements with the respective similar document elements selected by the similar document element selecting section;

a position information acquiring section that acquires a piece or pieces of position information indicating a position or positions of the one or the plurality of document elements contained in the document data; and a registering section that registers the groups of similar document elements in a storage unit in such a manner that the pieces of position information acquired by the position information acquiring section are correlated with the document elements respectively, wherein the one or the plurality of document elements are selected by a user, and wherein the registering section registers the groups of similar document elements in such a manner that similar document element numbers starting from 0 are correlated, in number order, with the respective similar document elements of each group.

\* \* \* \* \*